United States Patent
Nam et al.

(10) Patent No.: US 8,876,440 B2
(45) Date of Patent: Nov. 4, 2014

(54) CUTTING INSERT

(75) Inventors: Ki-Chan Nam, Chungcheongbuk-do (KR); Sang-Yong Lee, Chungcheongbuk-do (KR); Wook-Jung Sung, Chungcheongbuk-do (KR); Dong-Bok Park, Chungcheongbuk-do (KR); Jong-Chan Lee, Gyeongsangbuk-do (KR)

(73) Assignee: Korloy Inc., Seoul (KR)

( * ) Notice: Subject to any disclaimer, the term of this patent is extended or adjusted under 35 U.S.C. 154(b) by 106 days.

(21) Appl. No.: 13/570,788

(22) Filed: Aug. 9, 2012

(65) Prior Publication Data

US 2013/0336735 A1 Dec. 19, 2013

(30) Foreign Application Priority Data

Jun. 14, 2012 (KR) .................. 10-2012-0063600

(51) Int. Cl.
*B23B 27/16* (2006.01)
*B23C 5/20* (2006.01)

(52) U.S. Cl.
USPC .......................................... 407/113; 407/42

(58) Field of Classification Search
USPC ................. 407/113, 114, 115, 116, 42
See application file for complete search history.

(56) References Cited

U.S. PATENT DOCUMENTS

| | | | | |
|---|---|---|---|---|
| 5,454,671 | A * | 10/1995 | Qvarth | 407/42 |
| 5,957,629 | A * | 9/1999 | Hessman et al. | 407/113 |
| 6,238,146 | B1 * | 5/2001 | Satran et al. | 407/113 |
| 7,040,844 | B1 * | 5/2006 | Daiguji | 407/113 |
| 7,104,735 | B2 * | 9/2006 | Johnson et al. | 407/42 |
| 8,388,275 | B2 * | 3/2013 | Hecht | 407/113 |
| 8,556,546 | B2 * | 10/2013 | Smilovici et al. | 407/42 |
| 2006/0013661 | A1* | 1/2006 | Long et al. | 407/113 |
| 2012/0275868 | A1* | 11/2012 | Saito et al. | 407/42 |
| 2013/0129432 | A1* | 5/2013 | Jaeger et al. | 407/42 |
| 2013/0336735 | A1* | 12/2013 | Nam et al. | 407/113 |

\* cited by examiner

*Primary Examiner* — Will Fridie, Jr.
(74) *Attorney, Agent, or Firm* — Rabin & Berdo, P.C.

(57) ABSTRACT

A cutting insert, and more particularly, an improved double-sided cutting insert is provided, which provides improved machinability obtained due to increased rake angle, without compromising coupling state. The double-sided cutting insert includes a top surface, a bottom surface, a plurality of lateral relief surfaces connecting the top and bottom surfaces, and a cutting edge formed by the top and bottom surfaces and the plurality of lateral relief surfaces, in which one or more lateral relief surfaces of the plurality of lateral relief surfaces are formed into three stages in sequence which are a first positive surface, a negative surface and a second positive surface in a direction from the top surface to the bottom surface.

7 Claims, 9 Drawing Sheets

CUTTING INSERT

CROSS-REFERENCE TO RELATED APPLICATIONS

This application claims priority from Korean Patent Application No. 10-2012-0063600, filed on Jun. 14, 2012, in the Korean Intellectual Property Office, the disclosure of which is incorporated herein by reference in its entirety.

BACKGROUND OF THE INVENTION

1. Field of the Invention

The present invention relates to a double-sided cutting insert.

2. Description of the Related Art

Generally, a cutting tool is used for cutting irons, non-iron metals, or non-metallic materials, and is mounted on a machine tool to process a workpiece into a desired shape. Such machine tool includes a cutting insert having a cutting edge, and a tool holder to secure the cutting insert in place.

By way of example, a milling cutter uses the cutting insert in which length of the cutting edge contributing to cutting has to increase to enable deeper cuts in the orthogonal or lateral cutting. This leads into increased resistance on the overall cutting edge. Accordingly, various researches have been conducted to improve machinability and lifespan of the machine for high speed cutting, high feed cutting, or high depth cutting.

Figure 9:
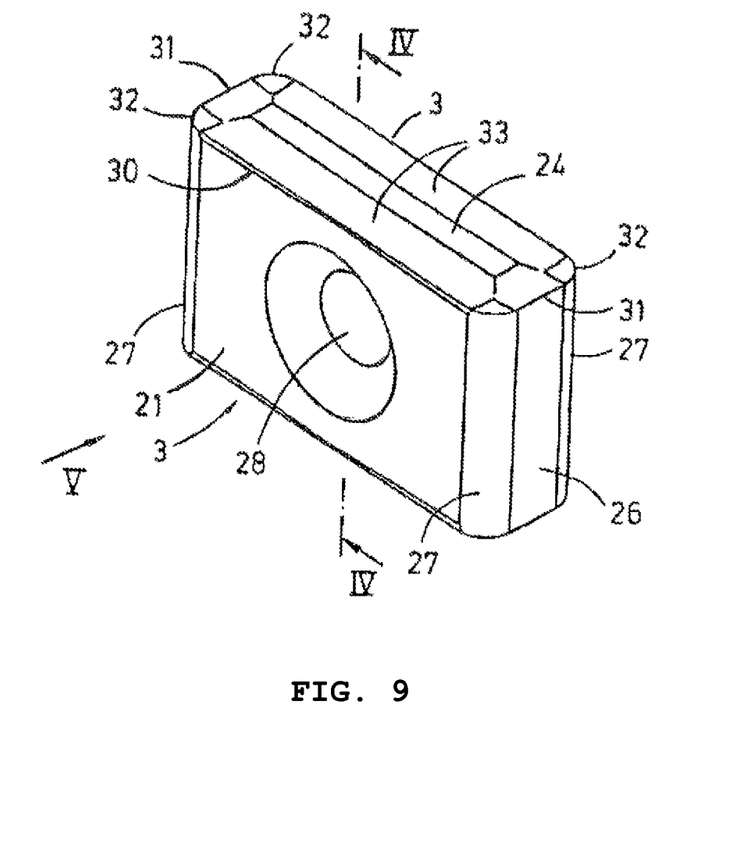
FIG. 9 illustrates a conventional negative type double-sided cutting insert.

FIG. 9 illustrates an example of a conventional double-sided cutting insert disclosed in WO 97/17157. For reference, FIG. 9 corresponds to FIG. 3 of WO 97/17157 in which the reference numerals of WO 97/17157 are used for convenience of illustration. Accordingly, reference numeral 30 denotes a cutting edge and reference numeral 21 denotes a major lateral surface.

Such conventional double-sided cutting insert is formed in negative configuration in which the major lateral surface is formed in negative type to design the cutting insert into two faces so that top and bottom surfaces can be used by turns. Since the surface of the workpiece and the cutting edge forms negative rake angle therebetween in the conventional double-sided cutting insert, machinability of the cutting insert deteriorates.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

In one embodiment, an improved double-sided cutting insert is provided, which maintains good coupling state and at the same time improving machinability by increasing rake angle.

In one embodiment, a double-sided cutting insert may include a top surface, a bottom surface, a plurality of lateral relief surfaces connecting the top and bottom surfaces, and a cutting edge formed by the top and bottom surfaces and the plurality of lateral relief surfaces, and one or more lateral relief surfaces of the plurality of lateral relief surfaces may be formed into three stages in sequence which are a first positive surface, a negative surface and a second positive surface in a direction from the top surface to the bottom surface.

The one or more lateral relief surface may be major lateral relief surfaces from among the plurality of lateral surfaces.

When the cutting insert is mounted on a cutter body, only the negative surfaces of the one or more major lateral relief surfaces may be brought into contact with a lateral seat surface of the cutter body, while the two positive surfaces of the one or more major lateral relief surface are not brought into contact with the lateral seat surface of the cutter body.

The double-sided cutting insert may include a passing hole extended through the negative surfaces of the one or more major lateral relief surfaces facing each other, and a recess formed around a periphery of the passing hole on the negative surfaces of the one or more major lateral relief surfaces for seating on a lateral seat surface of the cutter body.

In one embodiment, a double-sided cutting insert may include a top surface, a bottom surface, a plurality of lateral relief surfaces connecting the top and bottom surfaces, and a cutting edge formed by the top and bottom surfaces and the plurality of lateral relief surfaces, and one or more lateral relief surfaces of the plurality of lateral relief surfaces may be formed into two stages in sequence which are a first positive surface and a second positive surface in a direction from the top surface to the bottom surface.

An angle of the first and second positive surfaces may range between 1° and 7°.

According to the embodiments, since one or more lateral relief surfaces from among the plurality of lateral relief surfaces are formed into three stages of a first positive surface, a negative surface and a second positive surface in sequence in a direction from the top surface to the bottom surface, the rake angle during machining is improved compared to when the conventional negative type double-sided cutting insert is used, and accordingly, machinability improves.

Further, since only the negative surfaces of the lateral relief surfaces of the double-sided cutting insert contact the cutter body, coupling is maintained at the same degree as that of the conventional negative type double-sided cutting insert.

Further, stable coupling with the cutter body is achieved through the recess formed on the negative surfaces of the lateral relief surfaces.

Meanwhile, the effects of the embodiments are not limited to the above, and include other effects that can be obtained with the constitution of an embodiment.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

A double-sided cutting insert 100 according to an embodiment will be explained below with reference to the accompanying drawings.

Figure 1:
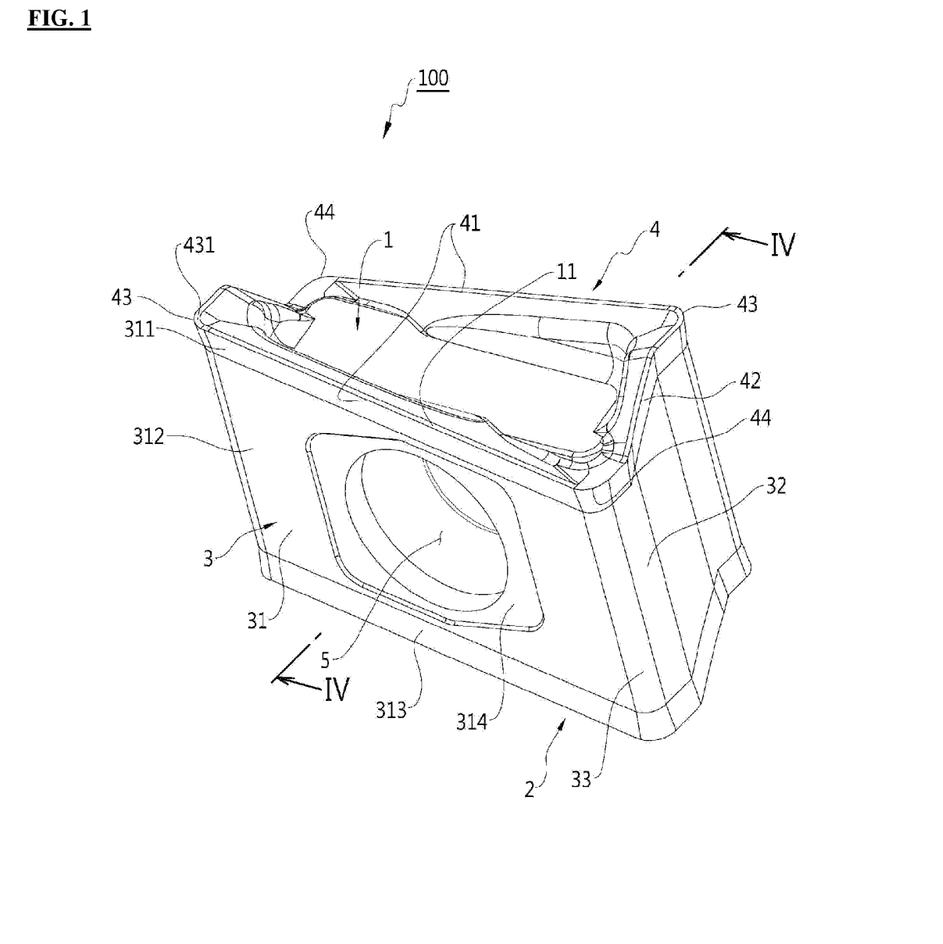
FIG. 1 is a perspective view of a double-sided cutting insert according to an embodiment.
Figure 2:
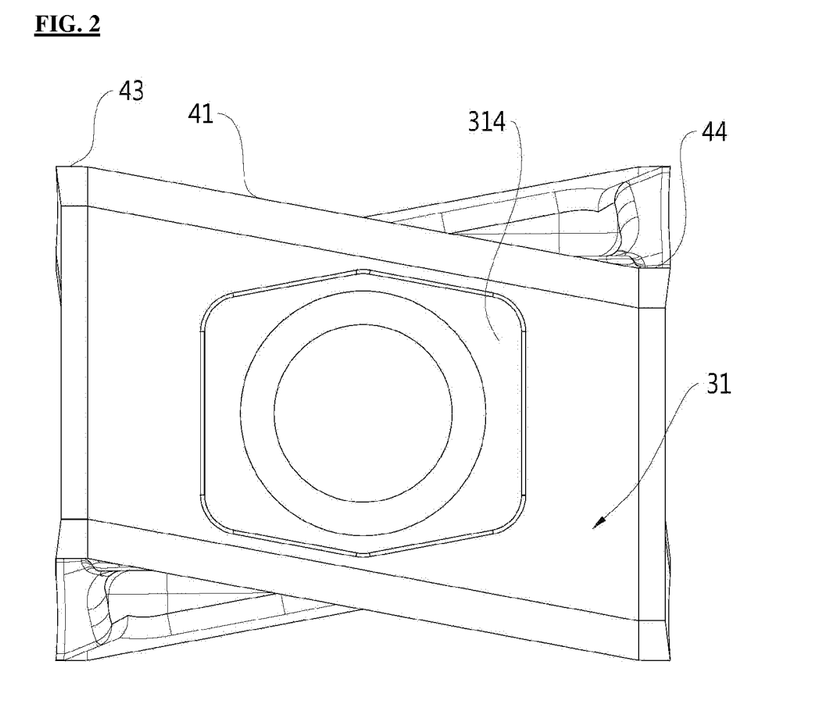
FIG. 2 is a side view of the double-sided cutting insert of FIG. 1.
Figure 3:
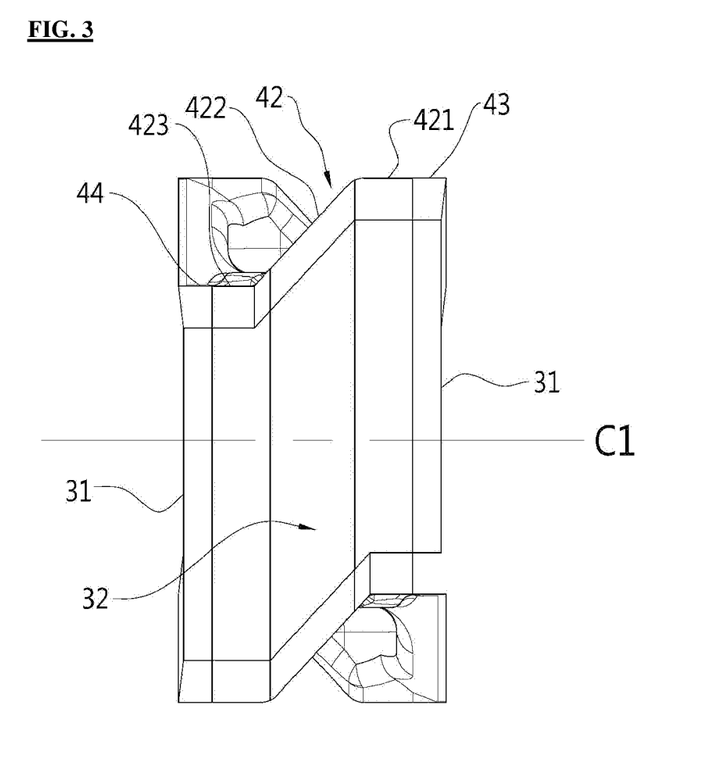
FIG. 3 is a front view of the double-sided cutting insert of FIG. 1.
Figure 4:
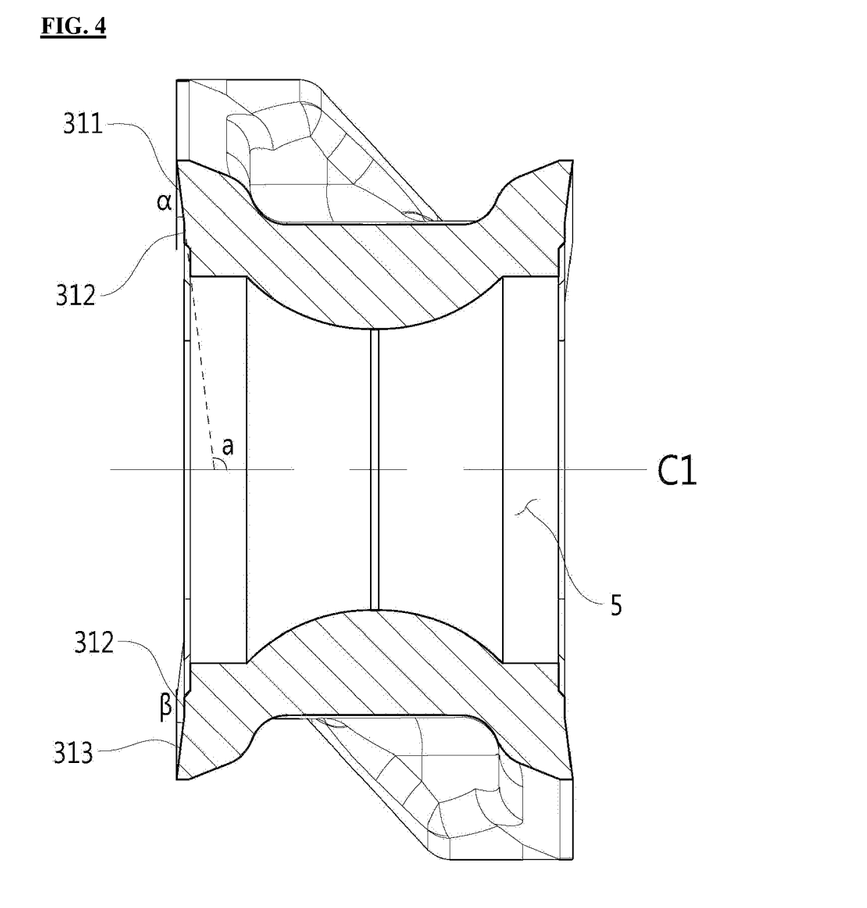
FIG. 4 is a cross-section view taken along line IV-IV of FIG. 1.
Figure 5:
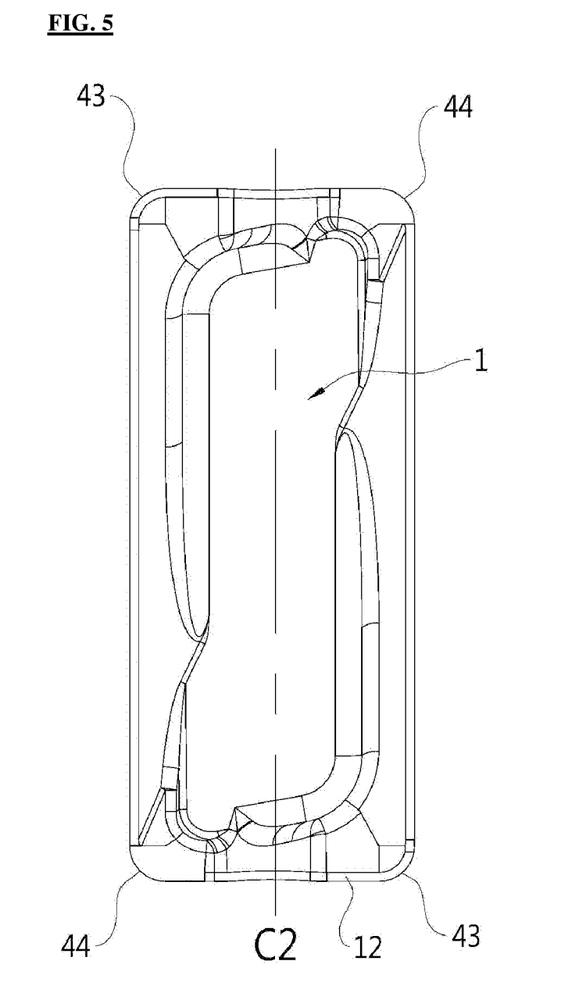
FIG. 5 is a plan view of the double-sided cutting insert of FIG. 1.

FIG. 1 is a perspective view of a double-sided cutting insert according to an embodiment, FIG. 2 is a side view of the double-sided cutting insert of FIG. 1, FIG. 3 is a front view of the double-sided cutting insert of FIG. 1, FIG. 4 is a cross-section view taken along line IV-IV of FIG. 1, and FIG. 5 is a plan view of the double-sided cutting insert of FIG. 1.

The double-sided cutting insert 100 according to an embodiment may be fabricated by processing sintered carbide with powder metallurgy such as section milling, powder injection molding (PIM), sintering, or grinding.

Referring to FIG. 1, the double-sided cutting insert 100 according to an embodiment includes a top surface 1, a bottom surface 2, a plurality of lateral relief surfaces 31, and a cutting edge 4 formed by the top and bottom surfaces 1, 2 and the plurality of lateral relief surfaces 3.

Referring to FIGS. 2 and 4, the top and bottom surfaces 1, 2 have identical shape and formed with 180° rotational symmetry with reference to an imaginary parallel centerline C1 illustrated in FIG. 3. Accordingly, in the cutting insert 100 according to an exemplary embodiment, the top and bottom surfaces 1, 2 are in identical shape.

The lateral relief surfaces 3 include major lateral relief surfaces 31 and minor lateral relief surfaces 32 connecting the top and bottom surfaces 1, 2. Corner lateral surfaces 33 are also provided to connect the major lateral relief surfaces 31 and minor lateral relief surfaces 32 adjoining therewith.

In the double-sided cutting insert 100 according to an embodiment, one or more lateral relief surfaces of the plurality of lateral relief surfaces 3 are formed into three stages, i.e., a first positive surface 311, a negative surface 312, and a second positive surface 313 formed in sequence in a downward direction from the top surface 1 to the bottom surface 2. As a result, the double-sided cutting insert according to an embodiment has enhanced rake angle and thus has enhanced machinability compared to the conventional negative type double-sided cutting insert, while maintaining the same degree of coupling as that of the conventional negative type double-sided cutting insert. As used herein, the 'positive surface' refers to the surface 311, 313 of which extended line forms obtuse angle (i.e, 90° or above) as the internal angle (a) with the parallel centerline C1, while the 'negative surface' refers to the surface 312 forming a perpendicular angle with the parallel centerline C1.

Figure 8:
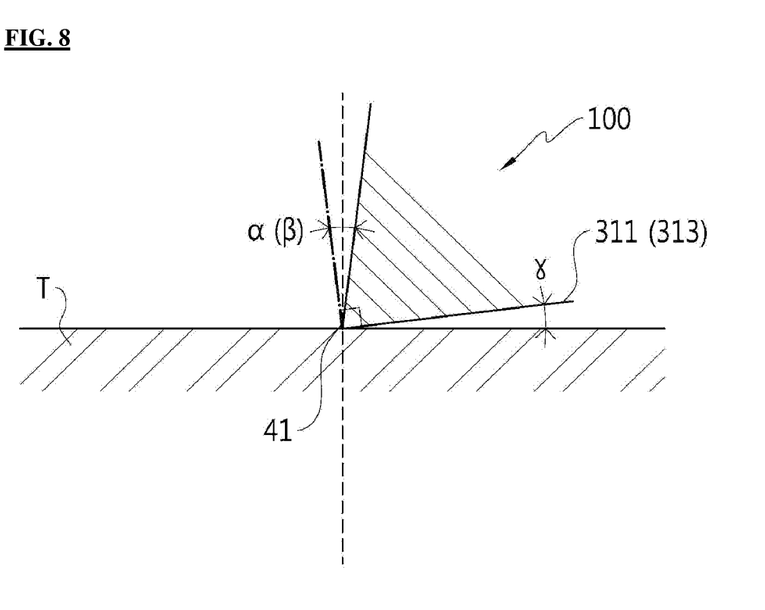
FIG. 8 illustrates a rake angle of the double-sided cutting insert of FIG. 1 compared with the conventional double-sided cutting insert.

Referring to FIG. 4, symbol a refers to an angle between the first positive surface 311 and the negative surface 312, and symbol β refers to an angle between the second positive surface 313 and the negative surface 312. The angle α between the first positive surface 311 and the negative surface 312, and the angle β between the second positive surface 313 and the negative surface 312 may be between 1° and 7°, and preferably, between 2° and 3°. Referring to FIG. 8, assuming that the same relief angle is maintained with the workpiece surface T, compared to the conventional double-sided cutting insert, the rake angle increases in relation with the angles α, β so that machinability improves on both the top and bottom surfaces. The one-dotted line in the drawing denotes the conventional double-sided cutting insert, and the solid line denotes the double-sided cutting insert according to an embodiment.

In a preferred embodiment, the angle α between the first positive surface 311 and the negative surface 312, and the angle β between the second positive surface 313 and the negative surface 312 may be identical, but not limited thereto. Accordingly, the angles may be varied depending on machining condition. Further, the width of the negative surface 312 may be preferably larger than those of the first positive surface 311 and the second positive surface 313 (see FIG. 4).

Meanwhile, referring to FIGS. 1 and 4, the double-sided cutting insert 100 according to an embodiment includes a passing hole 5 formed at approximately center of the two major lateral relief surfaces 31 facing each other. A fastening bolt is received in the passing hole 5 to couple the cutting insert 100 according to an embodiment with a milling cutter body which will be explained below. In one embodiment, the passing hole 5 is passed through the two facing major lateral relief surfaces 31, but an embodiment is not limited thereto. Accordingly, the passing hole 5 may be passed through the top and bottom surfaces 1, 2 as need arises.

In the double-sided cutting insert 100, the cutting edge 4 may include a major cutting edge 41 formed by the major lateral relief surfaces 31 and the top and bottom surfaces 1, 2, a minor cutting edge 42 formed by the minor lateral relief surface 32 and the top and bottom surfaces 1, 2, and corner cutting edges 43, 44 formed by the corner lateral surface 33 and the top and bottom surfaces 1, 2.

Meanwhile, referring to FIG. 2, the major cutting edge 41 is inclined from the left-hand side to the right-hand side of FIG. 2, and thus is divided into a first corner cutting edge 43 formed on the relatively higher position and a second corner cutting edge 44 formed on a relatively lower position.

Further, referring to FIG. 5, in the double-sided cutting insert 100 according to an embodiment, the top surface 1 has 180° rotational symmetry with reference to an imaginary centerline C2 crossing the center of the top surface 1 along the lengthwise direction of the top surface 1. Accordingly, the double-sided cutting insert 100 according to an embodiment includes first corner cutting edges 43 and second corner cutting edges 44 formed on two corners of the top surface 1 in symmetry with each other in a diagonal direction.

The top and bottom surfaces 1, 2 of the double-sided cutting insert 100 can be used by turns, and a chip breaker is formed on the top and bottom surfaces 1, 2 to induce flow of the chip during cutting process.

Further, a first corner cutting edge land surface 431 is connected to the first corner cutting edge 43.

Referring to FIG. 2, the major cutting edge 41 is extended along the major lateral relief surface 31 between the first corner cutting edge 43 and the second corner cutting edge 44 facing the first corner cutting edge 43. The major cutting edge 41 contributes to cutting as it is first brought into contact with the workpiece during cutting.

Further, referring to FIG. 3, a minor cutting edge 42 is extended between the first and second corner cutting edges 43, 44 to increase surface finishes of the processed surface of the workpiece.

Referring to FIG. 2, the first corner cutting edge 43 is formed higher than the top surface 1 and the second corner cutting edge 44 is formed lower than the top surface 1. That is, the major cutting edge 41 forms a line that gradually decreases in height and is connected between the first and second corner cutting edges 43, 44. The major cutting edge 41 is formed as the major lateral relief surface 31 and the top surface 1 meet each other, and connected to the major cutting edge land surface 11.

Referring to FIG. 3, the minor cutting edge 42 includes a first minor cutting edge 421, an inclining cutting edge 422 and a second minor cutting edge 423 which are formed in order along the minor lateral relief surface 32 between the first corner cutting edge 43 and the second corner cutting edge 44.

Further, referring to FIG. 2, a recess 314 may be formed around the passing hole 5 formed through the negative surface 312 of the major lateral relief surfaces 31 facing each other, to be seated on a lateral seat surface 211 of the milling cutter body 200 which will be explained below.

Figure 6:
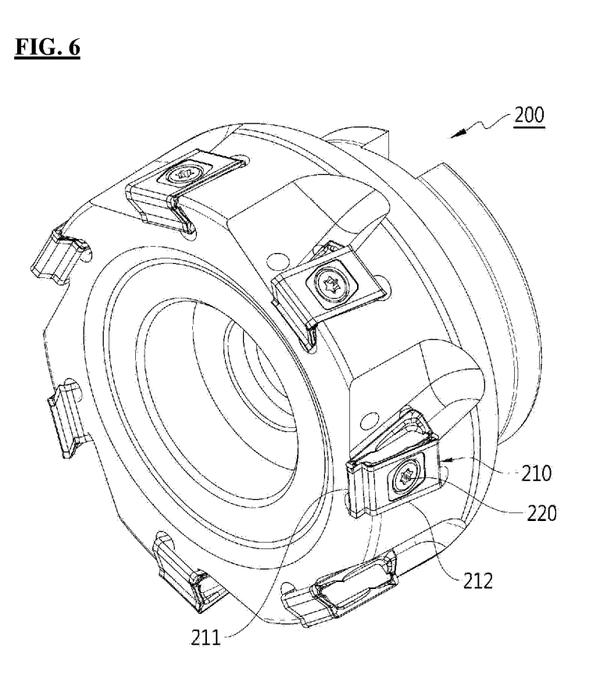
FIG. 6 illustrates the double-sided cutting insert of FIG. 1 mounted on a milling cutter body according to an example.
Figure 7:
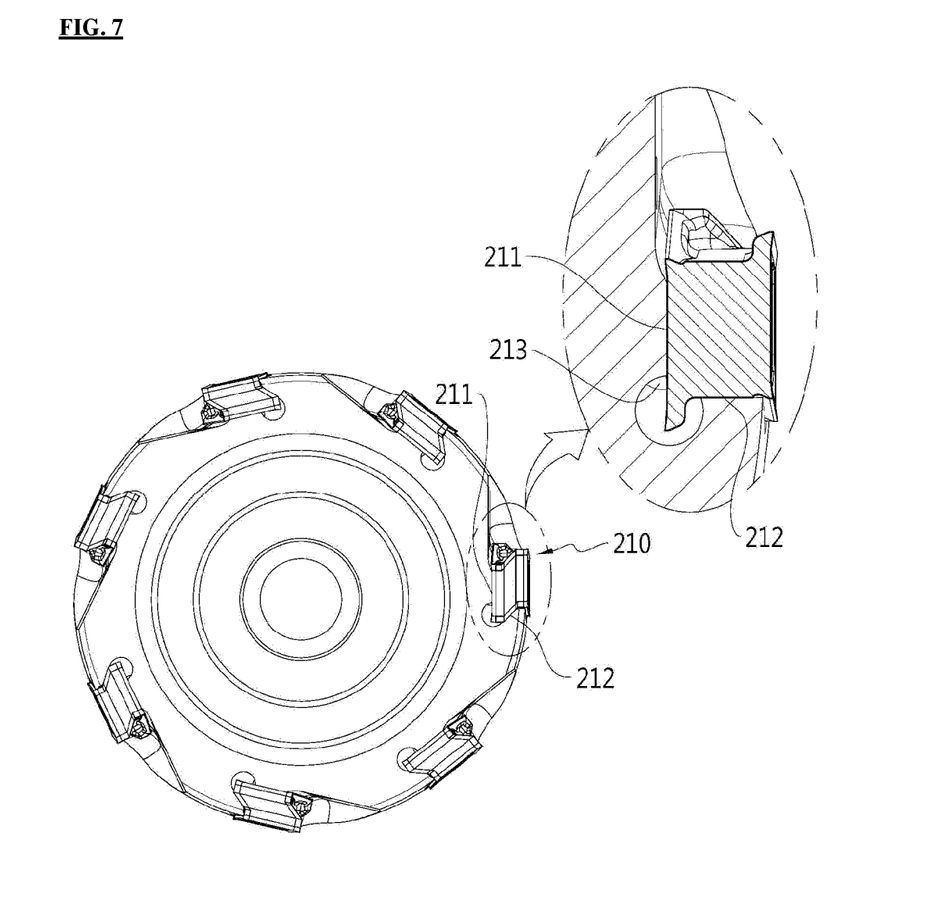
FIG. 7 is an enlarged view provided to explain a situation where the double-sided cutting insert of FIG. 1 is mounted on the milling cutter body.

Referring now to FIGS. 6 and 7, the situation where the double-sided cutting insert 100 is seated on the milling cutter body 200 will be explained. FIGS. 6 and 7 illustrate a situation where the double-sided cutting insert 100 according to an embodiment is engaged with the milling cutter body 200.

The milling cutter body 200 includes a plurality of insert seats 210 on which the double-sided cutting insert 100 according to an embodiment is seated. To be specific, the milling cutter body 200 includes a hole (tap) (not illustrated) engageable with the coupling bolt 220, a bottom seat surface 212 on which the bottom surface 2 of the cutting insert 100 according to an embodiment is seated, and a lateral seat surface 211 on which the negative surface 312 of the major lateral relief surface 31 of the double-sided cutting insert 100 is seated. Further, the insert seats 210 include a recess 213 to prevent contact with the positive surface 311 of the major lateral relief surface 31 of the double-sided cutting insert 100.

Referring to FIG. 7, when the double-sided cutting insert 100 according to an embodiment is mounted on the tool holder such as the milling cutter body 200, the negative surface 312 of the major lateral relief surface 31 alone is brought into contact with the lateral seat surface 211, while the rest two positive surfaces 311, 313 of the major lateral relief surface 31 are not brought into contact with the lateral seat surface 211 of the cutter body 200. Accordingly, since only the negative surface 312 of the double-sided cutting insert 100 contacts the lateral seat surface 211 of the cutter body 200, the degree of coupling is same as that of the conventional negative type double-sided cutting insert.

In the embodiments explained above, one or more lateral relief surfaces of the plurality of lateral relief surfaces 3 are divided into three stages, i.e., the first positive surface 311, the negative surface 312, and the second positive surface 313. However, depending on occasion, the lateral relief surfaces 3 of the double-sided cutting insert 100 may be divided into two stages, i.e., the first positive surface 311 and the second positive surface 313 extended from the top to bottom surfaces 1, 2. Like in the example where the lateral relief surfaces 3 are formed into three stages, the above-explained alternative example can also increase machinability due to increased rake angle during processing compared to the conventional negative type double-sided cutting insert. Meanwhile, for mounting on the cutter body, the first or second positive surface 311, 313 formed on the lateral relief surfaces 3 may be used as the mounting surface.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A cutting insert comprising a top surface, a bottom surface, a plurality of lateral relief surfaces connecting the top and bottom surfaces, and a cutting edge formed by the top and bottom surfaces and the plurality of lateral relief surfaces, wherein:
   one or more lateral relief surfaces of the plurality of lateral relief surfaces are formed into three stages in sequence which are a first positive surface, a negative surface and a second positive surface in a direction from the top surface to the bottom surface;
   the top and bottom surfaces are formed with 180° rotational symmetry with reference to an imaginary parallel centerline of the cutting insert; and
   the first and second positive surfaces, respectively, form an obtuse angle with a ray formed by cutting the parallel centerline, the ray going in a direction from the negative surface to an inside of the cutting insert, and the negative surface forms a right angle with the parallel centerline.

2. The cutting insert of claim 1, wherein the one or more lateral relief surface are major lateral relief surfaces from among the plurality of lateral relief surfaces.

3. The cutting insert of claim 2, wherein, when the cutting insert is mounted on a cutter body, only the negative surfaces of the one or more major lateral relief surfaces are brought into contact with a lateral seat surface of the cutter body, while the two positive surfaces of the one or more major lateral relief surface are not brought into contact with the lateral seat surface of the cutter body.

4. The cutting insert of claim 3, comprising a passing hole extended through the negative surfaces of the one or more major lateral relief surfaces facing each other, and a recess formed around a periphery of the passing hole on the negative surfaces of the one or more major lateral relief surfaces for seating on a lateral seat surface of the cutter body.

5. A cutting insert comprising a top surface, a bottom surface, a plurality of lateral relief surfaces connecting the top and bottom surfaces, and a cutting edge formed by the top and bottom surfaces and the plurality of lateral relief surfaces,
   wherein one or more lateral relief surfaces of the plurality of lateral relief surfaces are formed into two stages in sequence which are a first positive surface and a second positive surface in a direction from the top surface to the bottom surface;
   the top and bottom surfaces are formed with 180° rotational symmetry with reference to an imaginary parallel centerline of the cutting insert;
   the first and second positive surfaces, respectively, form an obtuse angle with a ray formed by cutting the parallel centerline, the ray going in a direction from the negative surface to an inside of the cutting insert.

6. The cutting insert of claim 1, wherein the obtuse angle formed respectively by the first and second positive surfaces with the ray ranges between 91° and 97°.

7. The cutting insert of claim 5, wherein the obtuse angle formed respectively by the first and second positive surfaces with the ray ranges between 91° and 97°.

* * * * *